US009131247B2

(12) United States Patent
Yin et al.

(10) Patent No.: US 9,131,247 B2
(45) Date of Patent: Sep. 8, 2015

(54) MULTI-VIEW VIDEO CODING USING SCALABLE VIDEO CODING

(75) Inventors: Peng Yin, West Windsor, NJ (US); Cristina Gomila, Princeton, NJ (US); Yeping Su, Vancouver, WA (US)

(73) Assignee: Thomson Licensing, Boulogne-Billancourt (FR)

( * ) Notice: Subject to any disclaimer, the term of this patent is extended or adjusted under 35 U.S.C. 154(b) by 1345 days.

(21) Appl. No.: 11/992,721

(22) PCT Filed: Oct. 17, 2006

(86) PCT No.: PCT/US2006/040658
§ 371 (c)(1),
(2), (4) Date: Mar. 28, 2008

(87) PCT Pub. No.: WO2007/047736
PCT Pub. Date: Apr. 26, 2007

(65) Prior Publication Data
US 2010/0165077 A1 Jul. 1, 2010

Related U.S. Application Data

(60) Provisional application No. 60/728,141, filed on Oct. 19, 2005.

(51) Int. Cl.
*H04N 19/615* (2014.01)
*H04N 19/597* (2014.01)
(Continued)

(52) U.S. Cl.
CPC ............. *H04N 19/615* (2013.01); *H04N 19/31* (2013.01); *H04N 19/33* (2013.01); *H04N 19/36* (2013.01);
(Continued)

(58) Field of Classification Search
USPC .................. 375/240.12–240.1, 240; 348/43
See application file for complete search history.

(56) References Cited

U.S. PATENT DOCUMENTS 5,612,735 A  3/1997 Haskell et al.
5,619,256 A * 4/1997 Haskell et al. .................. 348/43
(Continued)

FOREIGN PATENT DOCUMENTS

EP  0883300   12/1998
EP  1524859   4/2005
(Continued)

OTHER PUBLICATIONS

Yang et al., "Scalable Multiview Video Coding Using Wavelet," Nanyang Technological University, wxyang@pmail.ntu.edu.sg, 0-7803-8834-8/05, 2005, IEEE, XP-010816922.
(Continued)

*Primary Examiner* — Edan Orgad
*Assistant Examiner* — Emmanuel Maglo
(74) *Attorney, Agent, or Firm* — Robert D. Shedd; Paul P. Kiel; Xiaoan Lu

(57) ABSTRACT

There are provided methods and apparatus for stereoscopic video coding using scalable video coding. A scalable video encoder includes an encoder for encoding at least two views corresponding to multi-view video content by, encoding a particular view of the at least two views as a base layer, and encoding each of at least one other view of the at least two views as an enhancement layer using a prediction from a lower layer corresponding to at least one of the particular view and the at least one other view. The at least two views are encoded based on a selection from among at least two of temporal, spatial, and signal to noise ratio scalability techniques.

12 Claims, 9 Drawing Sheets

(51) Int. Cl.
*H04N 19/46* (2014.01)
*H04N 19/63* (2014.01)
*H04N 19/61* (2014.01)
*H04N 19/33* (2014.01)
*H04N 19/31* (2014.01)
*H04N 19/36* (2014.01)
*H04N 19/91* (2014.01)

(52) U.S. Cl.
CPC ............. *H04N 19/46* (2013.01); *H04N 19/597* (2013.01); *H04N 19/61* (2013.01); *H04N 19/63* (2013.01); *H04N 19/91* (2013.01)

(56) References Cited

U.S. PATENT DOCUMENTS

| | | | |
|---|---|---|---|
| 6,055,012 A | | 4/2000 | Haskell et al. |
| 7,650,036 B2* | | 1/2010 | Lei et al. ........................ 382/232 |
| 7,843,959 B2* | | 11/2010 | Kampmann et al. .......... 370/465 |
| 2005/0062846 A1* | | 3/2005 | Choi et al. ....................... 348/42 |
| 2005/0185711 A1 | | 8/2005 | Pfister et al. |
| 2006/0013490 A1* | | 1/2006 | Sun ............................... 382/232 |
| 2006/0045187 A1* | | 3/2006 | Auberger et al. ......... 375/240.25 |
| 2006/0082575 A1* | | 4/2006 | Auberger et al. .............. 345/421 |
| 2006/0133493 A1* | | 6/2006 | Cho et al. ................. 375/240.16 |
| 2006/0209959 A1* | | 9/2006 | Sun ........................... 375/240.16 |
| 2007/0041442 A1* | | 2/2007 | Novelo .................... 375/240.12 |
| 2007/0183499 A1* | | 8/2007 | Kimata et al. ............ 375/240.16 |
| 2008/0063085 A1* | | 3/2008 | Wu et al. .................. 375/240.25 |
| 2008/0205791 A1* | | 8/2008 | Ideses et al. .................. 382/285 |

FOREIGN PATENT DOCUMENTS

| | | |
|---|---|---|
| JP | Hei 11-018085 | 1/1999 |
| JP | 2005-124200 | 5/2005 |
| WO | WO2004059980 | 7/2004 |
| WO | WO2005069630 | 7/2005 |
| WO | WO 2005/081547 | 9/2005 |
| WO | WO2006104326 | 10/2006 |

OTHER PUBLICATIONS

International Organisation for Standardisation, "Information Technology—Generic Coding of Moving Pictures and Associated Audio: Video," ISO/IEC JTC1/SC29/WG11, N1366, Sep. 1996, pp. 1-30.

International Telecommunication Union, Series H: Audiovisual and Multimedia Systems Infrastructure of Audiovisual Services—Coding of Moving Video, "Advanced Video Coding for Generic Audiovisual Services," ITU-T Recommendation H.264, Mar. 2005.

Meer et al, International Organisation for Standardisation, Coding of Moving Pictures and Audio, "Draft depth map stream format", ISO/IEC JTC1/SC29/WG11, Oct. 2005, Nice.

Ohm, "Stereo/Multiview Video Encoding Using the MPEG Family of Standards," Part of the IS&T/SPIE Conference on Stereoscopic Displays and Applications X, San Jose, CA, Jan. 1999, SPIE, vol. 3639, 0277-786X/99, XP00802207.

Reichel et al., "Joint Scalable Video Model JSVM-3 Annex S," Joint Video Team (JVT) of ISO/IEC MPEG & ITU-T VCEG, Document: JVT-P202, 16th Meeting, Poland, Jul. 2005.

Vetro et al, "Video Transcoding Architectures and Techniques: An Overview," IEEE Signal Processing Magazine, 1053-5888/03, IEEE, Mar. 2003.

International Search Report, dated Mar. 22, 2007.

* cited by examiner

MULTI-VIEW VIDEO CODING USING SCALABLE VIDEO CODING

CROSS-REFERENCE TO RELATED APPLICATIONS

This application claims the benefit, under 35 U.S.C. §365 of International Application PCT/US2006/0406587, filed 17 Oct. 2006, which was published in accordance with PCT Article 21(2) on 26 Apr. 2007, in English and which claims the benefit of U.S. provisional patent application No. 60/728, 141 filed 19 Oct. 2005.

FIELD OF THE INVENTION

The present invention generally relates to video encoding and decoding and, more particularly, to a method and apparatus for Multi-view Video Coding (MVC) using scalable video coding.

BACKGROUND OF THE INVENTION

Stereoscopic video, also referred to as three dimensional (3-D) video, creates the illusion of depth for displayed images. One method for creating depth perception is to display two different two dimensional (2-D) images, where each image represents two perspectives of the same object, similar to the perspectives that both eyes naturally receive in binocular vision.

With the arrival of many high-quality stereoscopic displays in the market, it is desirable to provide a compression solution for stereoscopic video with superior coding efficiency and with reasonable coding complexity.

In recent years, much effort has been put in the design of efficient methods for compressing stereoscopic video. Conventional monoscopic compression methods can be applied independently to the left and right views of a stereo image pair. However, higher compression ratios can be achieved if the high correlation between views is exploited.

Regarding a prior art approach in which both views of a stereoscopic image pair are encoded, a Multi-View Profile (MVP) was defined in the International Organization for Standardization/International Electrotechnical Commission (ISO/IEC) Moving Picture Experts Group-2 (MPEG-2) standard to transmit a pair of video signals. MVP relies on a multi-layer signal representation approach such that one view (often the left view) is assigned to a base layer, and the other view is assigned to an enhancement layer. Monoscopic coding with the same tools as Main Profile (MP) is applied to the base layer. The enhancement layer is coded using temporal scalability tools and a hybrid prediction of motion and disparity fields.

In prior art methods relating to the International Organization for Standardization/International Electrotechnical Commission (ISO/IEC) Moving Picture Experts Group-4 (MPEG-4) Part 10 Advanced Video Coding (AVC) standard/ International Telecommunication Union, Telecommunication Sector (ITU-T) H.264 standard (hereinafter the "MPEG4/H.264 standard" or simply the "H.264 standard"), stereoscopic video coding can be performed in two different ways: (i) as a particular case of interlaced image coding, where all the fields of a particular parity are assigned to the left view and all the fields of the opposite parity are considered the right view of the stereo-view content; or alternatively (ii) by alternating frames from the left and rights views to create a single monoscopic video sequence. A stereovision supplemental enhancement information (SEI) message provides an indication to the decoder of whether or not the coded video sequence represents stereoscopic content and which method was used to encode the corresponding content.

These previously known methods require minimum modifications of existing monoscopic coding techniques. However, they show a limited ability for reducing the redundancy existing between the two views in a stereoscopic pair. As a result, the encoding of stereo-view results in a large overhead when compared to the encoding of a single monoscopic view. This problem has prevented the spread of stereovision for consumer applications with limited transmission bandwidth.

Other prior art methods include methods in which encoding is performed for one view plus some "additional 3-D information". This more general and simple approach to code stereoscopic content is to encode one single view plus some additional 3-D information allowing the receiver to render the second view of the stereoscopic pair. Traditionally, the transmitted 3-D information is represented by a depth and/or parity map. A depth map includes a 2-D image representation of the 3-D scene for which each pixel is assigned a depth value. Differences in pixel values correspond to differences in depth in the 3D scene. Often, depth data is encoded as a luminance channel only video stream.

In MPEG-4 Part 2, video object syntax includes so-called multiple auxiliary components (MAC), which are coded as gray-level images using motion-compensated DCT. Motion vectors of a video object will be used for the motion compensation of its auxiliary components. One utility of auxiliary components is to code depth or disparity map data. However, there is a restriction that auxiliary components must have the same size as the luminance component of the video object. The previous method shows an improved performance compared to MPEG-2 MVP. However, the MPEG-4 Part 2 standard has not been successfully deployed in the industry because of the superior coding gains of MPEG-4 part 10 and the high complexity of the proposed object oriented coding methods.

SUMMARY OF THE INVENTION

These and other drawbacks and disadvantages of the prior art are addressed by the present invention, which is directed to a method and apparatus for Multi-view Video Coding (MVC) using scalable video coding.

According to an aspect of the present principles, there is provided a scalable video encoder. The scalable video encoder includes an encoder for encoding at least two views corresponding to multi-view video content by, encoding a particular view of the at least two views as a base layer, and encoding each of at least one other view of the at least two views as an enhancement layer using a prediction from a lower layer corresponding to at least one of the particular view and the at least one other view. The at least two views are encoded based on a selection from among at least two of temporal, spatial, and signal to noise ratio scalability techniques.

According to another aspect of the present principles, there is provided a method for scalable video encoding. The method includes encoding at least two views corresponding to multi-view video content by, encoding a particular view of the at least two views as a base layer, and encoding each of at least one other view of the at least two views as an enhancement layer using a prediction from a lower layer corresponding to at least one of the particular view and the at least one other view. The at least two views are encoded based on a selection from among at least two of temporal, spatial, and signal to noise ratio scalability techniques.

According to yet another aspect of the present principles, there is provided a scalable video decoder for scalable video decoding. The scalable video decoder includes a decoder for decoding at least two views corresponding to multi-view video content by, decoding a particular view of the at least two views as a base layer, and decoding each of at least one other view of the at least two views as an enhancement layer using a prediction from a lower layer corresponding to at least one of the particular view and the at least one other view. The at least two views are decoded based on a selection from among at least two of temporal, spatial, and signal to noise ratio scalability techniques.

According to still another aspect of the present principles, there is provided a method for scalable video decoding. The method includes decoding at least two views corresponding to multi-view video content by, decoding a particular view of the at least two views as a base layer, and decoding each of at least one other view of the at least two views as an enhancement layer using a prediction from a lower layer corresponding to at least one of the particular view and the at least one other view. The at least two views are decoded based on a selection from among at least two of temporal, spatial, and signal to noise ratio scalability techniques.

According to a further aspect of the present principles, there is provided a video signal structure for scalable video encoding. The video signal structure includes a particular view of at least two views encoded as a base layer, and at least one other view of the at least two views encoded as an enhancement layer using a prediction from a lower layer corresponding to at least one of the particular view and the at least one other view. The at least two views correspond to multi-view video content and are encoded based on a selection from among at least two of temporal, spatial, and SNR scalability techniques.

According to a still further aspect of the present principles, there is provided a storage media having scalable video signal data encoded thereupon. The scalable video signal data includes a particular view of at least two views encoded as a base layer, and at least one other view of the at least two views encoded as an enhancement layer using a prediction from a lower layer corresponding to at least one of the particular view and the at least one other view. The at least two views correspond to multi-view video content and are encoded based on a selection from among at least two of temporal, spatial, and SNR scalability techniques.

According to an additional aspect of the present principles, there is provided a scalable video encoder. The scalable video encoder includes an encoder for encoding a first stereoscopic view as a base layer, and encoding at least one of a depth map and a disparity map as an enhancement layer using a prediction from the first stereoscopic view. The first stereoscopic view and the at least one of the depth map and the disparity map each correspond to a particular stereoscopic content and are encoded based on a selection from among at least two of temporal, spatial, and SNR scalability techniques.

According to another aspect of the present principles, there is provided a method for scalable video encoding. The method includes encoding a first stereoscopic view as a base layer, encoding at least one of a depth map and a disparity map as an enhancement layer using a prediction from the first stereoscopic view. The first stereoscopic view and the at least one of the depth map and the disparity map each correspond to a particular stereoscopic content and are encoded based on a selection from among at least two of temporal, spatial, and SNR scalability techniques.

According to yet another aspect of the present principles, there is provided a scalable video decoder. The scalable video decoder includes a decoder for decoding a first stereoscopic view from a base layer, and decoding at least one of a depth map and a disparity map from an enhancement layer using a prediction from the first stereoscopic view. The first stereoscopic view and the at least one of the depth map and the disparity map each correspond to a particular stereoscopic content and are decoded based on a selection from among at least two of temporal, spatial, and SNR scalability techniques.

According to still another aspect of the present principles, there is provided a method for scalable video decoding. The method includes decoding a first stereoscopic view from a base layer, and decoding at least one of a depth map and a disparity map from an enhancement layer using a prediction from the first stereoscopic view. The first stereoscopic view and the at least one of the depth map and the disparity map each correspond to a particular stereoscopic content and are decoded based on a selection from among at least two of temporal, spatial, and SNR scalability techniques.

According to a still further aspect of the present principles, there is provided a video signal structure for scalable video encoding. The video signal structure includes a first stereoscopic view encoded as a base layer, and at least one of a depth map and a disparity map encoded as enhancement layer to allow a prediction from the first stereoscopic view. The first stereoscopic view and the at least one of the depth map and the disparity map each correspond to a particular stereoscopic content and are encoded based on a selection from among at least two of temporal, spatial, and SNR scalability techniques.

According to an additional aspect of the present principles, there is provided a storage media having scalable video signal data encoded thereupon. The scalable video signal data includes a first stereoscopic view encoded as a base layer, and at least one of a depth map and a disparity map encoded as enhancement layer to allow a prediction from the first stereoscopic view. The first stereoscopic view and the at least one of the depth map and the disparity map each correspond to a particular stereoscopic content and are encoded based on a selection from among at least two of temporal, spatial, and SNR scalability techniques.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
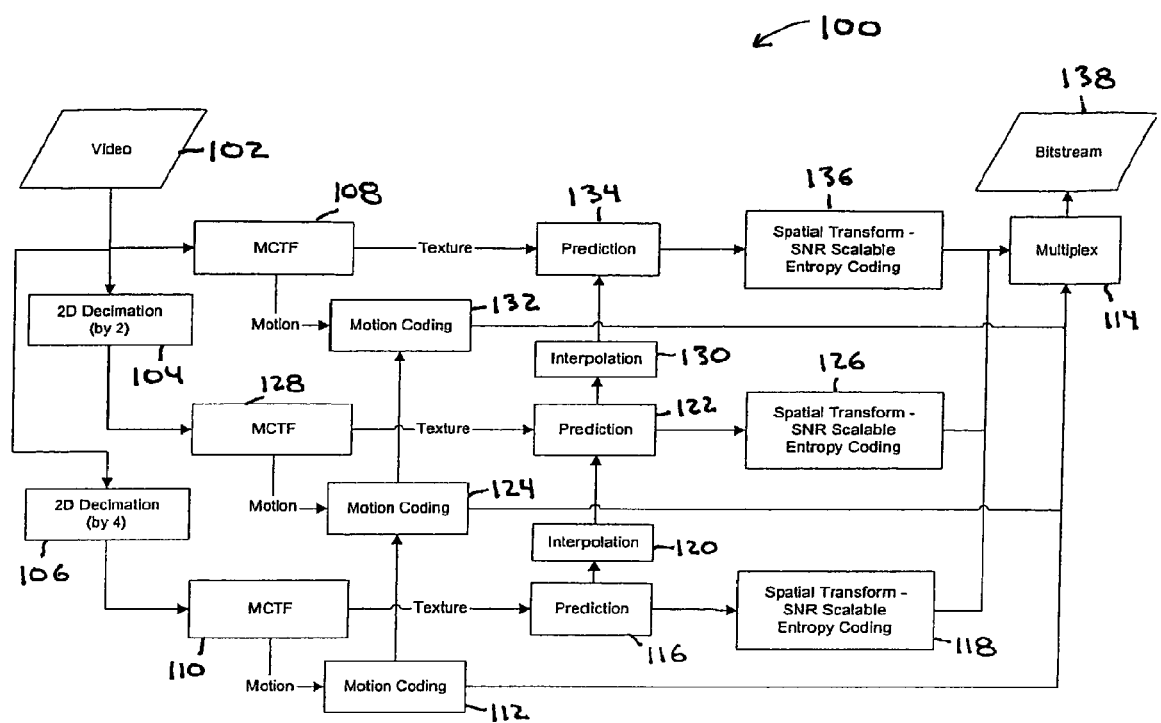
FIG. 1 shows a block diagram for an exemplary Joint Scalable Video Model (JSVM) 3.0 encoder to which the present principles may be applied.

The present invention is directed to a method and apparatus for Multi-view Video Coding (MVC) using scalable video coding. For illustrative purposes, the exemplary embodiments of the present invention are described with respect to stereoscopic (two-view) video content. However, given the teachings of the present principles provided herein, one of ordinary skill in this and related arts will be able to readily extend the present principles to multi-view video content, corresponding to two or more views, while maintaining the scope of the present invention.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary Joint Scalable Video Model Version 3.0 (hereinafter "JSVM3.0") encoder to which the present invention may be applied is indicated generally by the reference numeral 100. The JSVM3.0 encoder 100 uses three spatial layers and motion compensated temporal filtering. The JSVM encoder 100 includes a two-dimensional (2D) decimator 104, a 2D decimator 106, and a motion compensated temporal filtering (MCTF) module 108, each having an input for receiving video signal data 102.

An output of the 2D decimator 106 is connected in signal communication with an input of a MCTF module 110. A first output of the MCTF module 110 is connected in signal communication with an input of a motion coder 112, and a second output of the MCTF module 110 is connected in signal communication with an input of a prediction module 116. A first output of the motion coder 112 is connected in signal communication with a first input of a multiplexer 114. A second output of the motion coder 112 is connected in signal communication with a first input of a motion coder 124. A first output of the prediction module 116 is connected in signal communication with an input of a spatial transformer 118. An output of the spatial transformer 118 is connected in signal communication with a second input of the multiplexer 114. A second output of the prediction module 116 is connected in signal communication with an input of an interpolator 120. An output of the interpolator is connected in signal communication with a first input of a prediction module 122. A first output of the prediction module 122 is connected in signal communication with an input of a spatial transformer 126. An output of the spatial transformer 126 is connected in signal communication with the second input of the multiplexer 114. A second output of the prediction module 122 is connected in signal communication with an input of an interpolator 130. An output of the interpolator 130 is connected in signal communication with a first input of a prediction module 134. An output of the prediction module 134 is connected in signal communication with a spatial transformer 136. An output of the spatial transformer is connected in signal communication with the second input of a multiplexer 114.

An output of the 2D decimator 104 is connected in signal communication with an input of a MCTF module 128. A first output of the MCTF module 128 is connected in signal communication with a second input of the motion coder 124. A first output of the motion coder 124 is connected in signal communication with the first input of the multiplexer 114. A second output of the motion coder 124 is connected in signal communication with a first input of a motion coder 132. A second output of the MCTF module 128 is connected in signal communication with a second input of the prediction module 122.

A first output of the MCTF module 108 is connected in signal communication with a second input of the motion coder 132. An output of the motion coder 132 is connected in signal communication with the first input of the multiplexer 114. A second output of the MCTF module 108 is connected in signal communication with a second input of the prediction module 134. An output of the multiplexer 114 provides an output bitstream 138.

For each spatial layer, a motion compensated temporal decomposition is performed. This decomposition provides temporal scalability. Motion information from lower spatial layers can be used for prediction of motion on the higher layers. For texture encoding, spatial prediction between successive spatial layers can be applied to remove redundancy. The residual signal resulting from intra prediction or motion compensated inter prediction is transform coded. A quality base layer residual provides minimum reconstruction quality at each spatial layer. This quality base layer can be encoded into an H.264 standard compliant stream if no inter-layer prediction is applied. For quality scalability, quality enhancement layers are additionally encoded. These enhancement layers can be chosen to either provide coarse or fine grain quality (SNR) scalability.

Figure 2:
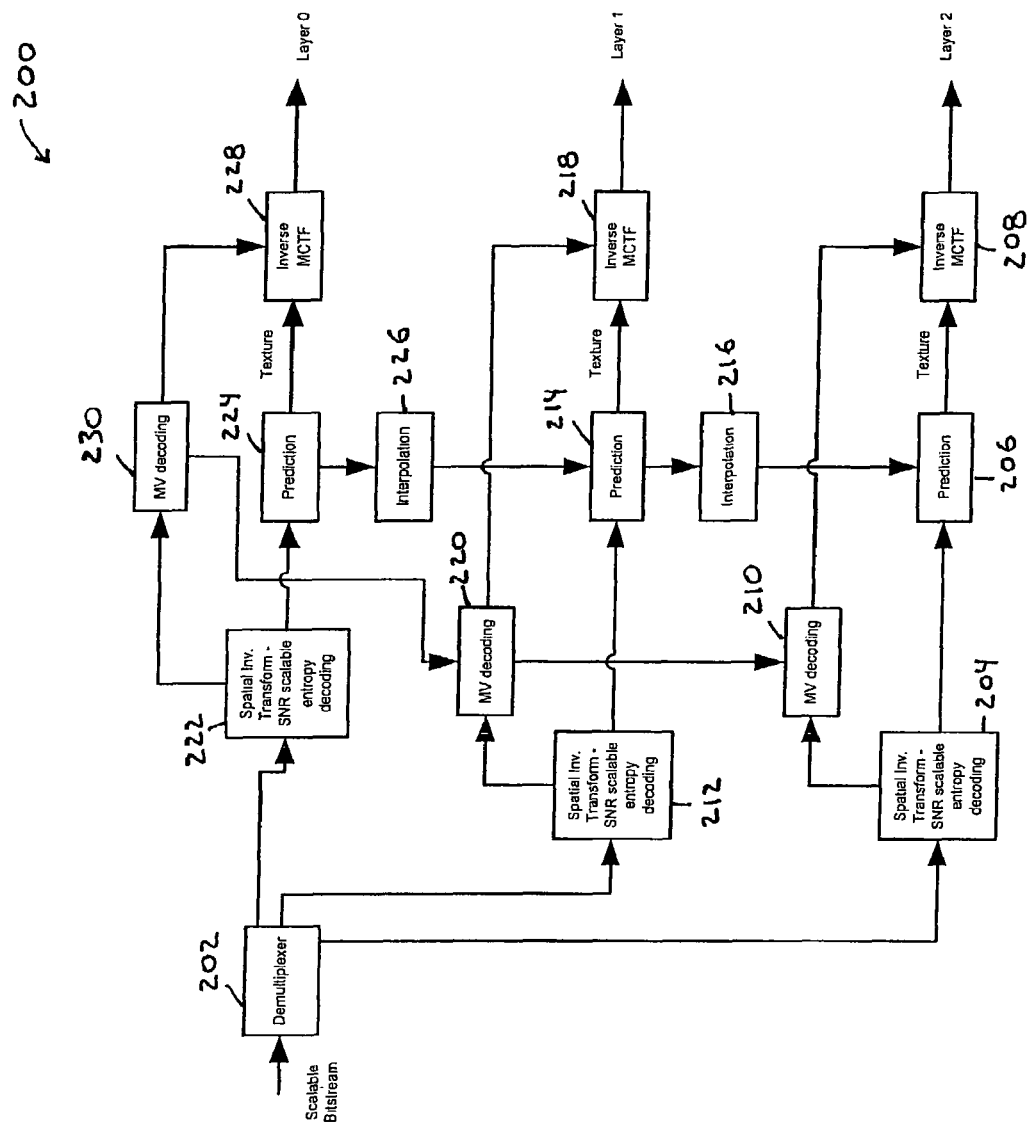
FIG. 2 shows a block diagram for an exemplary decoder to which the present principles may be applied.

Turning to FIG. 2, an exemplary scalable video decoder to which the present invention may be applied is indicated generally by the reference numeral 200. An input of a demultiplexer 202 is available as an input to the scalable video decoder 200, for receiving a scalable bitstream. A first output of the demultiplexer 202 is connected in signal communication with an input of a spatial inverse transform SNR scalable entropy decoder 204. A first output of the spatial inverse transform SNR scalable entropy decoder 204 is connected in signal communication with a first input of a prediction module 206. An output of the prediction module 206 is connected in signal communication with a first input of an inverse MCTF module 208.

A second output of the spatial inverse transform SNR scalable entropy decoder 204 is connected in signal communication with a first input of a motion vector (MV) decoder 210. An output of the MV decoder 210 is connected in signal communication with a second input of the inverse MCTF module 208.

A second output of the demultiplexer 202 is connected in signal communication with an input of a spatial inverse transform SNR scalable entropy decoder 212. A first output of the spatial inverse transform SNR scalable entropy decoder 212 is connected in signal communication with a first input of a prediction module 214. A first output of the prediction module 214 is connected in signal communication with an input of an interpolation module 216. An output of the interpolation module 216 is connected in signal communication with a second input of the prediction module 206. A second output of the prediction module 214 is connected in signal communication with a first input of an inverse MCTF module 218.

A second output of the spatial inverse transform SNR scalable entropy decoder 212 is connected in signal communication with a first input of an MV decoder 220. A first output of the MV decoder 220 is connected in signal communication with a second input of the MV decoder 210. A second output of the MV decoder 220 is connected in signal communication with a second input of the inverse MCTF module 218.

A third output of the demultiplexer 202 is connected in signal communication with an input of a spatial inverse transform SNR scalable entropy decoder 222. A first output of the spatial inverse transform SNR scalable entropy decoder 222 is connected in signal communication with an input of a prediction module 224. A first output of the prediction module 224 is connected in signal communication with an input of an interpolation module 226. An output of the interpolation module 226 is connected in signal communication with a second input of the prediction module 214.

A second output of the prediction module 224 is connected in signal communication with a first input of an inverse MCTF module 228. A second output of the spatial inverse transform SNR scalable entropy decoder 222 is connected in signal communication with an input of an MV decoder 230. A first output of the MV decoder 230 is connected in signal communication with a second input of the MV decoder 220. A second output of the MV decoder 230 is connected in signal communication with a second input of the inverse MCTF module 228.

An output of the inverse MCTF module 228 is available as an output of the decoder 200, for outputting a layer 0 signal. An output of the inverse MCTF module 218 is available as an output of the decoder 200, for outputting a layer 1 signal. An output of the inverse MCTF module 208 is available as an output of the decoder 200, for outputting a layer 2 signal.

For spatial, temporal and SNR scalability, a large degree of inter-layer prediction is incorporated. Intra and inter macroblocks can be predicted using the corresponding signals of previous layers. Moreover, the motion description of each layer can be used for a prediction of the motion description for following enhancement layers. These techniques fall into three categories: inter-layer intra texture prediction, inter-layer motion prediction and inter-layer residue prediction.

In accordance with the present principles, we disclose two exemplary embodiments for encoding stereoscopic video that are capable of being used with Scalable Video Coding (herein after also referred to as "H.264 SVC" or simply "SVC") that is currently being developed as an amendment to the H.264 standard. According to the first method, stereoscopic content is encoded in SVC as a view pair (left and right views, or alternatively, a first and second stereoscopic view). According to the second method, stereoscopic content is encoded in SVC as one view plus depth/parity maps. For each method of the two exemplary embodiments, a new message, indicator, or the like (for example, a Supplemental Enhancement Information (SEI) message) is used to indicate the SVC bitstream is used for stereoscopic video coding.

It is to be appreciated that while embodiments of the present principles are described herein with respect to H.264 SVC, those skilled in this and related arts will realize that the present principles are not so limited and may be readily applied to other video coding standards as well (including, e.g., but not limited to various MPEG standards, including MPEG-2) while maintaining the scope of the present principles.

In accordance with the first exemplary embodiment, coding both views of a stereoscopic image pair in a scalable video coding scheme is performed by coding one view as base layer, and coding the second view in an enhancement layer. A major difference between the present principles and MPEG-2 MVP scheme is that the present principles do not require the two views to be coded using only temporal scalability. Therefore, in accordance with the present principles, the stereoscopic views may be coded (and therefore later decoded) as temporal, spatial, or SNR scalability, depending on the demands and efficiencies available for a specific application requirement.

For example, temporal scalability is more suitable when we need the most coding efficiency. Spatial/SNR scalability are more suitable when a corresponding application can benefit from different spatial resolution/quality between two views.

In order to support a non-stereo display to be able to decode the video without decoding the enhancement layer and to allow another view to have different resolutions, for spatial scalability applications we propose to use a scaling factor less than, or equal to, 1 in one exemplary aspect of the first exemplary embodiment.

Illumination and color discrepancies across different camera views are common in captured stereoscopic videos. Possible causes of such undesired discrepancies include, but are not limited to, poor camera calibration, different light projection direction and different surface reflection characteristic. Weighted Prediction (WP) originally developed in the H.264 standard is an effective tool to compensate for illumination/color differences when texture prediction between two views is involved. WP is supported in SVC, but it only allows for the same layer or temporal scalability. Therefore, in accordance with one exemplary implementation of the first exemplary embodiment, since we code one view in the base layer and a second view in the enhancement layer in the first exemplary embodiment, for temporal scalability, we can simply enable WP in SVC to provide a benefit in coding efficiency for cross view prediction. For spatial or SNR scalability, we propose to add WP support for Intra_BL mode, i.e., coding the difference between the macroblock in the enhancement layer and the weighted macroblock in the base layer.

A new supplemental enhancement information (SEI) message is provided that supports the exemplary first embodiment described herein and specifies which view corresponds to the base layer. The SEI message is shown in Table 1. For example, when base_layer_is_left_view_flag is equal to 1, this indicates that the left view is coded in the base layer. Conversely, when base_layer_is_left_view_flag is equal to 0, this indicates that the right view is coded in the base layer.

TABLE 1

| svc_stereo_video_info( payloadSize ) { | C | Descriptor |
|---|---|---|
| base_layer_is_left_view_flag | 5 | u(1) |
| } | | |

It is to be noted that since this metadata is not required by the decoding process, the metadata could be transmitted out of band according to a different syntax specification.

In accordance with the second exemplary embodiment, one view is coded and a depth and/or disparity map in used in the enhancement layer to support a conventional non-stereo display to be able to decode the video without decoding the depth maps. We can apply spatial, or SNR scalability, depending on the application requirement. Since the depth map can be coded at a lower resolution, in spatial scalability, one possible preferred embodiment uses a scaling factor less than, or equal to, 1.

A new SEI message is provided that supports the second exemplary embodiment and that provides additional 3-D metadata that is conveyed to assist the rendering process of the non-transmitted view. In a particular embodiment, the transmitted metadata may include two parameters (Nknear, Nkfar) as shown in Table 2. With these two parameters and the depth map, the correct pixel parallax can be calculated and will result in the intended depth effect on the display as seen by the viewer.

Nknear specifies the knear ratio parameter normalized to 128 that shall be applied to calculate the screen parallel of a newly rendered view.

Nkfar specifies the kfar ratio parameter normalized to 32 that shall be applied to calculate the screen parallel of a newly rendered view.

TABLE 2

| depth_map_descriptor( payloadSize ) { | C | Descriptor |
|---|---|---|
| Nknear | 5 | u(8) |
| Nkfar | 5 | u(8) |
| } | | |

It is to be noted that since this metadata is not required by the decoding process, the metadata could be transmitted out of band according to a different syntax specification.

One major problem of using a depth map and one coded view (e.g., the left view) to construct the other non-transmitted view (e.g., the right view) is that areas which are occluded in the left view might be visible in the right view. This might create holes in the right view. Another problem is that because the left view and the depth map are lossy coded, errors may exist between the reconstructed right view and the original right view. To improve the quality of the non-transmitted view, an additional SNR layer can be added. The additional SNR layer should be combined with the SEI message, so the decoder will know that the refinement is based on the reconstructed non-coded view.

It should be noted that currently in SVC (which uses Joint Scalable Video Model 3 (JSVM3)), spatial scalability only handles resolution scaling larger than or equal to one. In accordance with the present invention, inter-layer prediction is used to support resolution scaling less than one.

For inter-lay prediction, the following issues should be addresses to handle spatial scalability for resolution scaling less than one: (1) mixed-block processing; (2) macroblock type mapping; (3) motion vector scaling; 4) texture scaling. New and/or prior techniques, including those relating to spatial resolution transcoding, may be used to address these issues.

Figure 3:
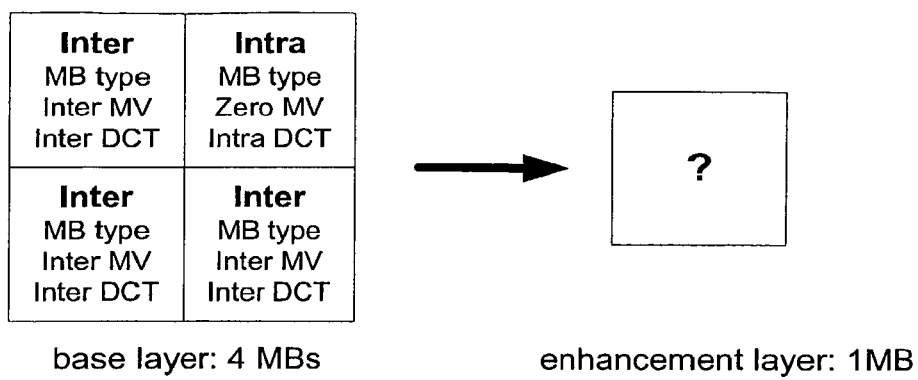
FIG. 3 is a diagram for an exemplary macroblock mapping for inter-layer prediction in SVC spatial scalability for a scaling factor equal to ½ for each dimension.

For simplicity, we may allow SVC to only support the scaling factor to be $2^{(-n)}$, where n>0. Turning to FIG. 3, an exemplary macroblock mapping for inter-layer prediction in SVC spatial scalability for a scaling factor equal to ½ for each dimension is indicated generally by the reference numeral 300. In such an example, one macroblock in the enhancement layer corresponds to four macroblocks in the base layer. Since those four macroblocks may have different intra/inter modes and SVC does not allow mixing modes in one macroblock, we need to decide what mode should be used for the macroblock in the enhancement layer in inter-layer prediction. We propose to force the macroblock to be inter mode, and assume the motion vectors (MVs) and discrete cosine transform (DCT) residues in intra-macroblock to be zero. For macroblock type mapping, since the smallest partition in SVC is 4×4, but the downscaling by 2 can result in a partition as small as 2×2, we propose to group each four 2×2 partitions into one 4×4 partition. The MV for each 4×4 partition is set to the MV of the corner of the corresponding 8×8 sub-macroblock. For the reference picture index, we group each four 4×4 partitions into one 8×8 partition. The reference picture index is assigned to that of the corner of the associated macroblock. For motion vector scaling, MVE=(MVB+1)>>1, where MVE is the enhancement layer motion vector, and MVB is the corresponding base layer motion vector. For texture downscaling involving the residue, we can use the simple average method. For spatial texture, we can use the simple average method or the MPEG-4 downscaling function currently used in JSVM. For the scaling factor of $2^{(-n)}$, we can iteratively scale by ½ (n times).

It is to be appreciated that as used herein, the term "depth/disparity map" is contemplated to refer to one or more depth maps and/or one or more disparity maps.

Figure 4:
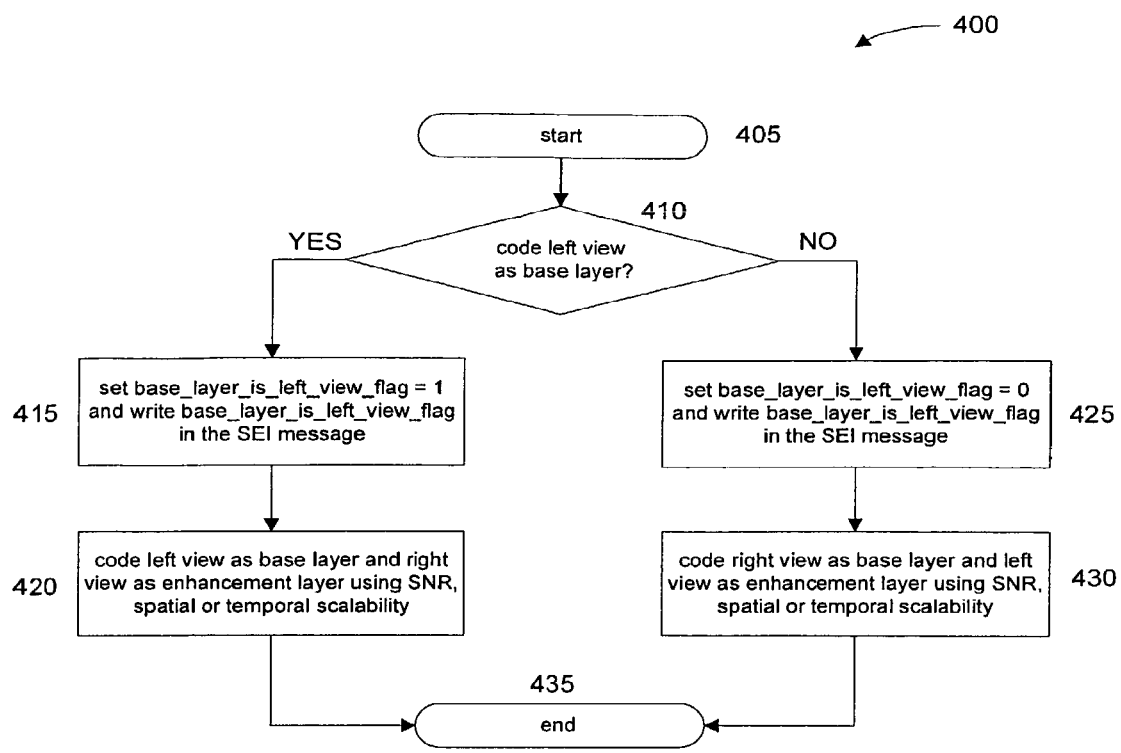
FIG. 4 is a diagram for a method for scalable video encoding capable of encoding a pair of stereoscopic views of stereoscopic content in accordance with an exemplary first embodiment of the present principles.
Figure 5:
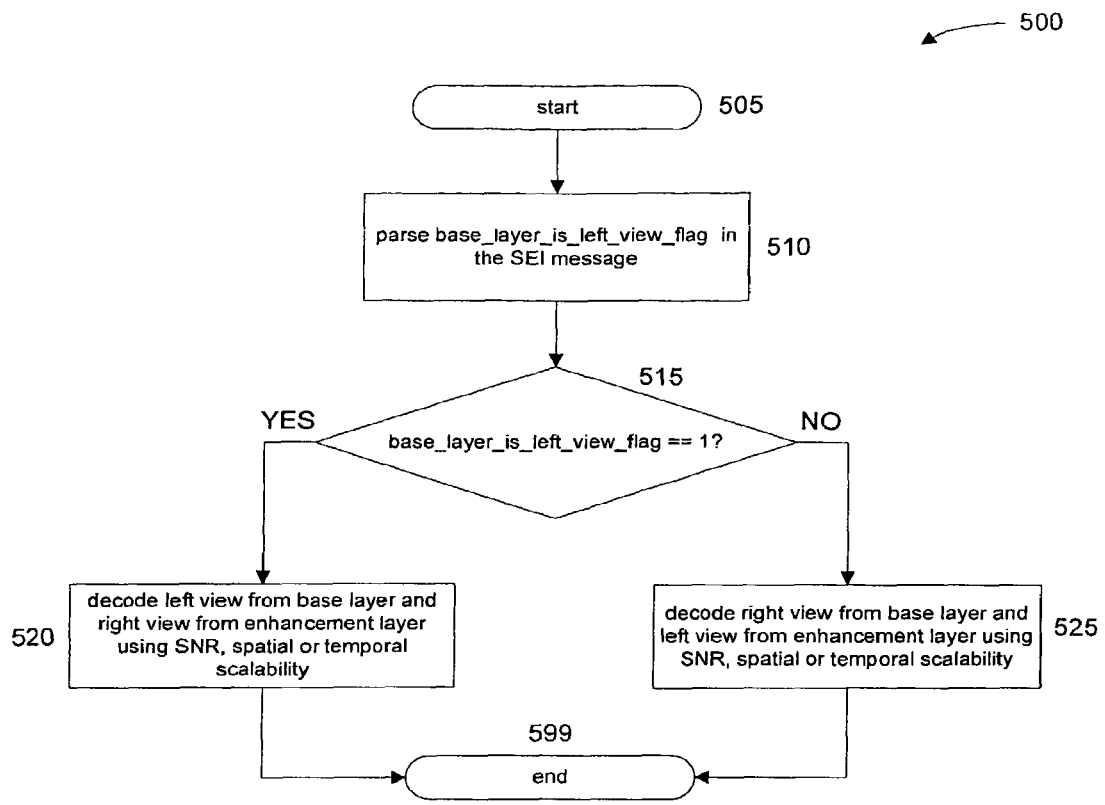
FIG. 5 is a diagram for a method for scalable video decoding capable of decoding a pair of stereoscopic views of stereoscopic content in accordance with the exemplary first embodiment of the present principles.

FIGS. 4 and 5 correspond to the first exemplary embodiment of the present principles.

Turning to FIG. 4, a method for scalable video encoding capable of encoding a pair of stereoscopic views of stereoscopic content is indicated generally by the reference numeral 400. The method 400 includes a start block 405 that passes control to a decision block 410. The decision block 410 determines whether or not to code a left view of the stereoscopic content as a base layer. If so, then control is passed to a function block 415. Otherwise, control is passed to a function block 425.

The function block 415 sets a base_layer_is_left_view_flag equal to one, writes the base_layer_is_left_view_flag in a supplemental enhancement information (SEI) message, and passes control to a function block 420. The function block 420 codes the left view as the base layer and the right view as an enhancement layer, and passes control to an end block 435.

The function block 425 sets the _base_layer_is_left_view_flag equal to zero, writes the base_layer is_left_view_flag in the SEI message, and passes control to a function block 430. The function block 430 codes the right view as the base layer and the left view as the enhancement layer using SNR, spatial, and/or temporal scalability, and passes control to the end block 435.

Turning to FIG. 5, a method for scalable video decoding capable of decoding a pair of stereoscopic views of stereoscopic content is indicated generally by the reference numeral 500. The method 500 includes a start block 505 that passes control to a function block 510. The function block parses the base_layer_is_left_view_flag in the SEI message, and passes control to a decision block 515. The decision block 515 determines whether or not the base_layer is_left_view_flag is equal to one. If so, then control is passed to a function block 520. Otherwise, control is passed to a function block 525.

The function block 520 decodes the left view from the base layer and the right view from the enhancement layer using SNR, spatial, and/or temporal scalability, and passes control to an end block 599.

The function block 525 decodes the right view from the base layer and the left view from the enhancement layer using SNR, spatial, and/or temporal scalability, and passes control to the end block 599.

Figure 6:
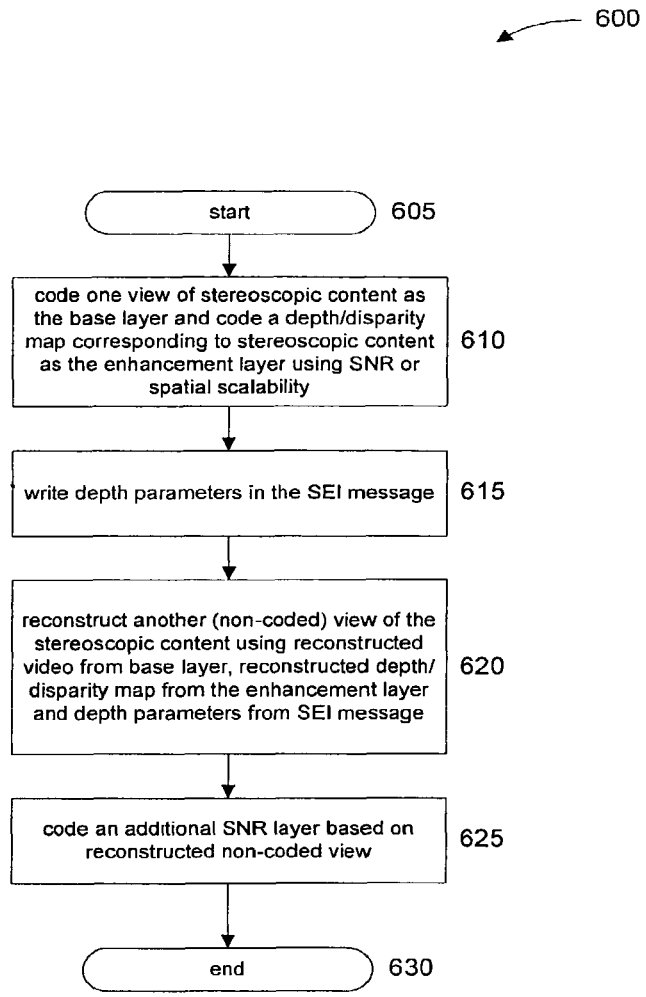
FIG. 6 is a diagram for a method for scalable video encoding capable of encoding a pair of stereoscopic views of stereoscopic content in accordance with an exemplary second embodiment of the present principles.
Figure 7:
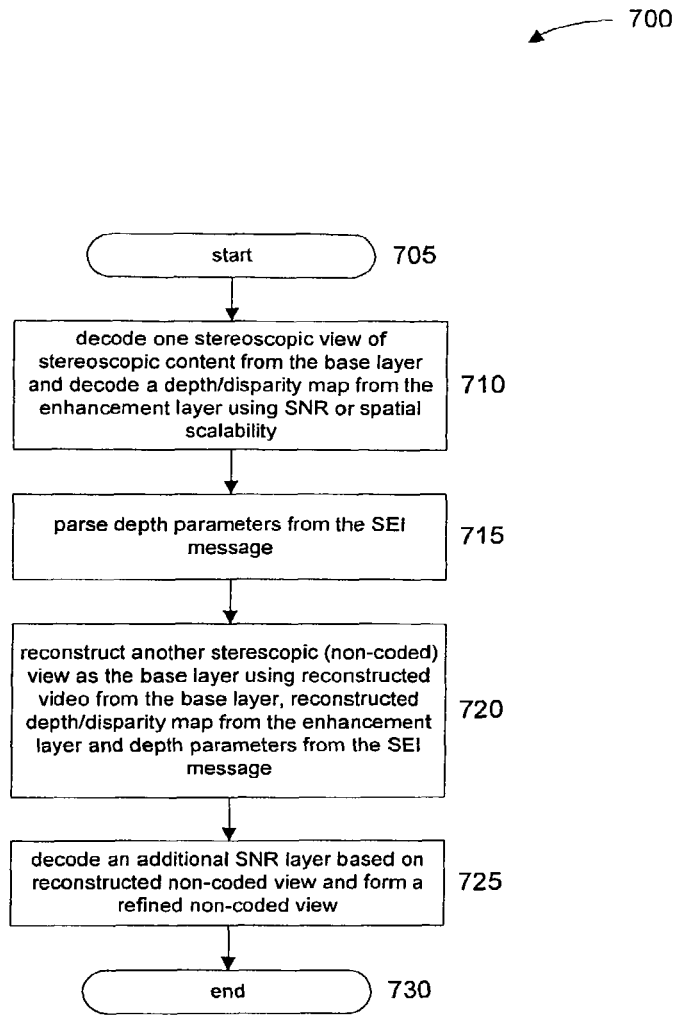
FIG. 7 is a diagram for a method for scalable video decoding capable of decoding a pair of stereoscopic views of stereoscopic content in accordance with the exemplary second embodiment of the present principles.

FIGS. 6 and 7 correspond to the second exemplary embodiment of the present principles.

Turning to FIG. 6, a method for scalable video encoding capable of encoding a pair of stereoscopic views of stereoscopic content is indicated generally by the reference numeral 600. The method 600 includes a start block 605 that passes control to a function block 610. The function block 610 codes one view of the stereoscopic content as a base layer and codes a depth/disparity map corresponding to the stereoscopic video as an enhancement layer using SNR, spatial, and/or temporal scalability, and passes control to a function block 615. The function block 615 writes depth parameters in the SEI message, and passes control to a function block 620. The function block 620 reconstructs another (non-coded) view of the stereoscopic content using reconstructed video from the base layer, a reconstructed depth/disparity map from the enhancement layer and depth parameters from the SEI message, and passes control to a function block 625. The function block 625 codes an additional SNR layer based on the reconstructed non-coded view, and passes control to an end block 630.

Turning to FIG. 7, a method for scalable video decoding capable of decoding a pair of stereoscopic views of stereoscopic content is indicated generally by the reference numeral 700. The method 700 includes a start block 705 that passes control to a function block 710. The function block 710 decodes one stereoscopic view of stereoscopic content from the base layer, decodes a depth/disparity map from the enhancement layer, using SNR, spatial and/or temporal scalability, and passes control to a function block 715. The function block 715 parses depth messages from the SEI message, and passes control to a function block 720. The function block 720 reconstructs another stereoscopic (non-coded) view as the base layer using reconstructed video from the base layer, reconstructed depth/disparity map from the enhancement layer, and depth parameters from the SEI message, and passes control to a function block 725. The function block 725 decodes an additional SNR layer based on the reconstructed non-coded view, forms a refined non-coded view, and passes control to an end block 730.

Figure 8:
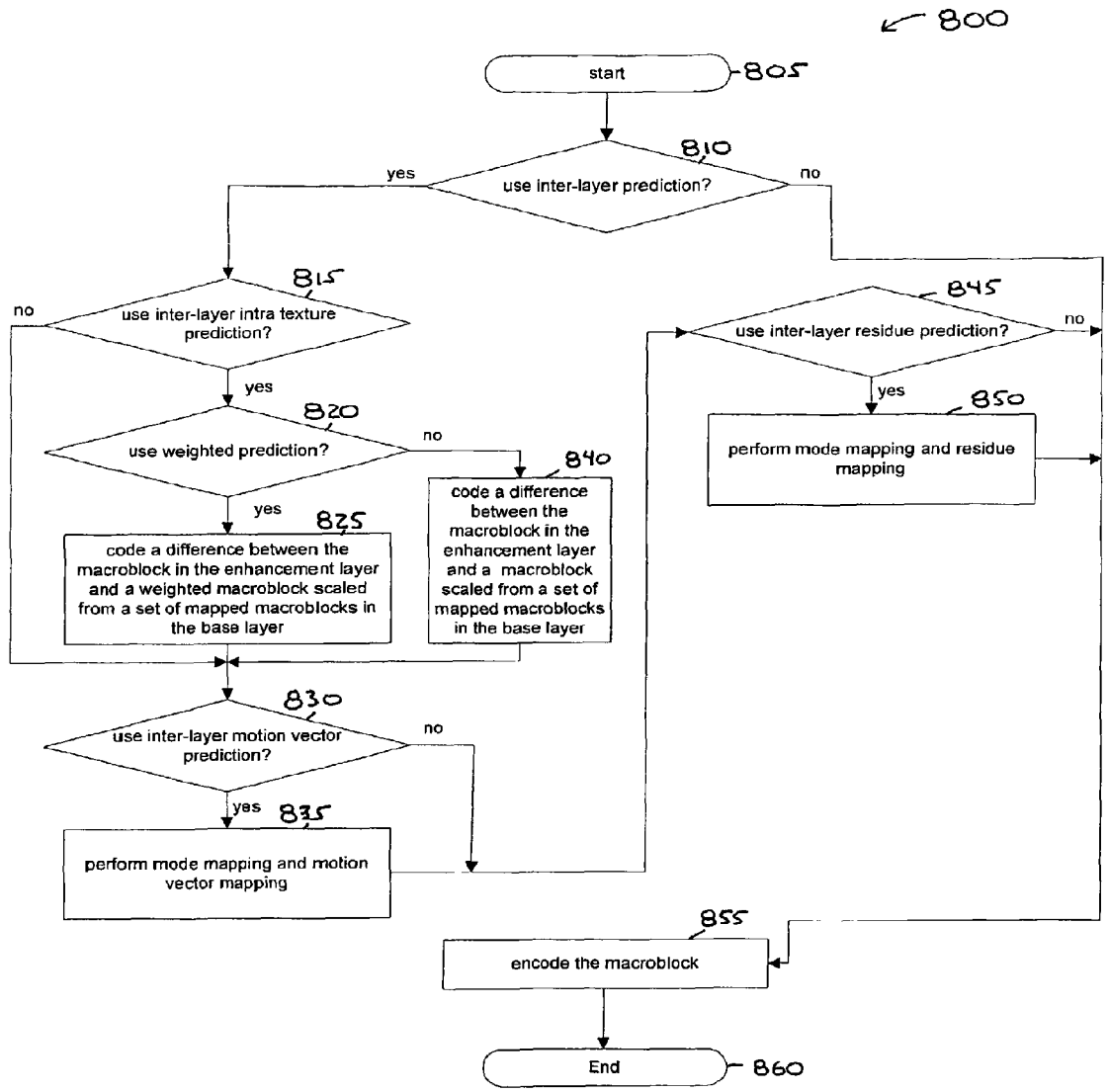
FIG. 8 is a scalable video coding method for encoding a macroblock in an enhancement layer in accordance with an exemplary embodiment of the present principles.

Turning to FIG. 8, a scalable video coding method for encoding a macroblock in an enhancement layer is indicted generally by the reference numeral 800. The method 800 includes a start block 805 that passes control to a decision block 810. The decision block 810 determines whether or not to use inter-layer prediction. If so, then control is passed to a decision block 815. Otherwise, control is passed to a function block 855.

The decision block 815 determines whether or not to use inter-layer intra texture prediction. If so, then control is passed to a decision block 820. Otherwise, control is passed to a decision block 830.

The decision block 820 determines whether or not to use weighted prediction. If so, then control is passed to a function block 825. Otherwise, control is passed to a function block 840.

The function block 825 codes a different between the macroblock in the enhancement layer and a weighted macroblock scaled from a set of mapped macroblocks in the base layer, and passes control to the decision block 830.

The decision block 830 determines whether or not to use inter-layer motion vector prediction. If so, then control is passed to a function block 835. Otherwise, control is passed to a decision block 845.

The function block 835 performs mode mapping and motion vector mapping, and passes control to the decision block 845.

The decision block 845 determines whether or not inter-layer residue prediction. If so, then control is passed to a function block 850. Otherwise, control is passed to the function block 855.

The function block 850 performs mode mapping and residue mapping, and passes control to the function block 855. In an embodiment, function block 850 may involve setting the spatial scaling factor equal to $2^{(-n)}$, n being an integer greater than zero, and performing averaging for texture downsampling of residues corresponding to the at least some blocks (850).

The function block 855 encodes the macroblock, and passes control to an end block 860.

The function block 840 codes a difference between the macroblock in the enhancement layer and a macroblock scaled from a set of mapped macroblocks in the base layer, and passes control to the decision block 830.

In an embodiment, function block 855 may involve constraining a spatial scaling factor to be equal to or less than one, when the spatial scalability technique is selected In an embodiment, function blocks 835, 850, and/or 855 may involve, e.g., setting a spatial scaling factor equal to $2^{(-n)}$, n being an integer greater than zero, performing a many-to-one block mapping from the base layer to the enhancement layer, converting blocks in the base layer having an intra prediction mode to an inter-prediction mode, and forcing motion vectors and discrete cosine transform coefficients in the intra-prediction mode to be zero.

In an embodiment, function blocks 835 and/or 855 may involve, e.g., mapping a motion vector for a block in the enhancement layer to a scaled motion vector of a corner of a corresponding mapped block from a set of mapped blocks in the base layer, and assigning a reference index for the block in the enhancement layer to that of the corner of the corresponding mapped block in the base layer, the block in the enhancement layer being co-located with respect to the set of mapped blocks in the base layer.

In an embodiment, function blocks 850 and/or 855 may involve setting the spatial scaling factor equal to $2^{(-n)}$, n being an integer greater than zero, and performing averaging for texture downsampling of residues.

Figure 9:
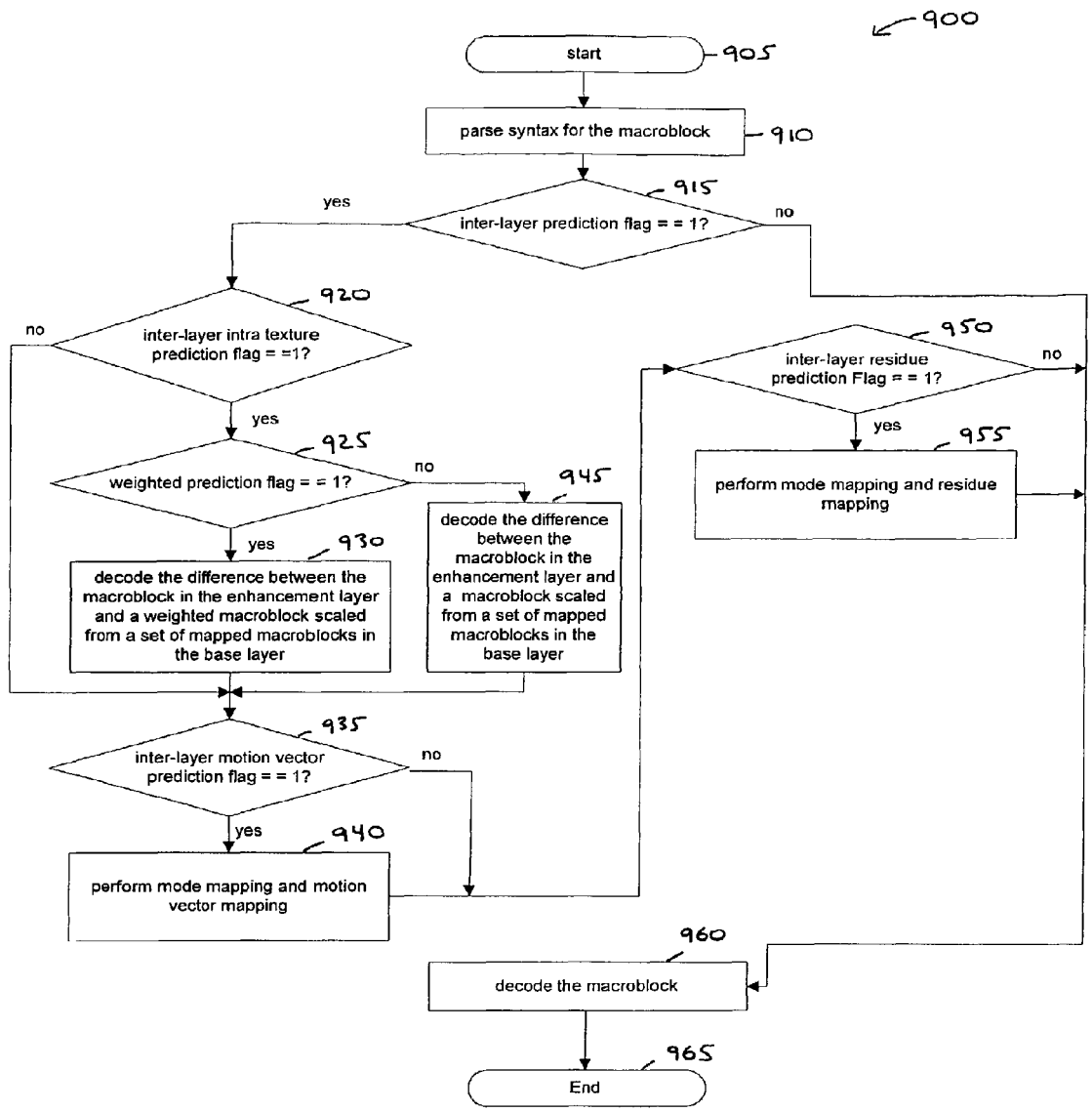
FIG. 9 is a scalable video decoding method for decoding a macroblock in an enhancement layer in accordance with an exemplary embodiment of the present principles.

Turning to FIG. 9, a scalable video decoding method for decoding a macroblock in an enhancement layer is indicated generally by the reference numeral 900. The method 900 includes a start block 905 that passes control to a function block 910. The function block 910 parses syntax for the macroblock, and passes control to a decision block 915. The decision block 915 determines whether or not an inter-layer prediction flag is equal to one. If so, then control is passed to a decision block 920. Otherwise, control is passed to a function block 960.

The decision block 920 determines whether or not an inter-lay intra texture prediction flag is equal to one. If so, then control is passed to a decision block 925. Otherwise, control is passed to a decision block 935.

The decision block 925 determines whether or not a weighted prediction flag is equal to one. If so, then control is passed to a function block 930. Otherwise, control is passed to a function block 945.

The function block 930 decodes the difference between the macroblock in the enhancement layer and a weighted macroblock scaled from a set of mapped macroblocks in the base layer, and passes control to a decision block 935.

The decision block 935 determines whether or not an inter-layer motion vector prediction flag is equal to one. If so, then control is passed to a function block 940. Otherwise, control is passed to a decision block 950.

The function block 940 performs mode mapping and motion vector mapping, and passes control to the decision block 950.

The decision block 950 determines whether or not an inter-layer residue prediction flag is equal to one. If so, then control is passed to a function block 955. Otherwise, control is passed to a function block 960.

The function block 955 performs mode mapping and residue mapping, and passes control to the function block 960.

The function block 960 decodes the macroblock, and passes control to an end block 965.

The function block 945 decodes the difference between the macroblock in the enhancement layer and a macroblock scaled from a set of mapped macroblocks in the base layer, and passes control to the decision block 935.

A description will now be given of some of the many attendant advantages/features of the present invention, some of which have been mentioned above. For example, one advantage/feature is scalable video encoder including an encoder for encoding at least two views corresponding to multi-view video content by, encoding a particular view of the at least two views as a base layer, and encoding each of at least one other view of the at least two views as an enhancement layer using a prediction from a lower layer corresponding to at least one of the particular view and the at least one other view. The at least two views are encoded based on a selection from among at least two of temporal, spatial, and signal to noise ratio scalability techniques.

Another advantage/feature is the scalable video encoder as described above, wherein the base layer and the enhancement layer are included a video bitstream, and the encoder adds an indicator in a message signaling the video bitstream. The indicator is for indicating that the video bitstream includes multi-view video signals.

Yet another advantage/feature is the scalable video encoder that adds the indicator in a message as described above, wherein the message is a Supplemental Enhancement Information (SEI) message.

Moreover, another advantage/feature is the scalable video encoder that adds the indicator in a message as described above, wherein the message is sent out of band.

Further, another advantage/feature is the scalable video encoder that adds the indicator in a message as described above, wherein the indicator is provided as metadata.

Also, another advantage/feature is the scalable video encoder that adds the indicator in a message as described above, wherein the indicator specifies one of the particular view or the at least one other view as being encoded in one of the base layer or the enhancement layer.

Additionally, another advantage/feature is the scalable video encoder as described above, wherein the temporal, spatial, and signal to noise ratio scalability techniques are performed in compliance with the Scalable Video Coding Extension of the International Organization for Standardization/International Electrotechnical Commission Moving Picture Experts Group-4 Part 10 Advanced Video Coding standard/International Telecommunication Union, Telecommunication Sector H.264 standard.

Moreover, another advantage/feature is the scalable video encoder as described above, wherein the encoder constrains a spatial scaling factor to be equal to or less than one, when the spatial scalability technique is selected.

Further, another advantage/feature is the scalable video encoder that constrains the spatial scaling factor as described above, wherein the encoder encodes at least some blocks in the base layer and the enhancement layer using inter-layer prediction, by setting the spatial scaling factor equal to $2^{(-n)}$, n being an integer greater than zero, performing a many-to-one block mapping from the base layer to the enhancement layer, converting any of the at least some blocks in the base layer having an intra prediction mode to an inter-prediction mode, and forcing motion vectors and discrete cosine transform coefficients in the intra-prediction mode to be zero.

Also, another advantage/feature is the scalable video encoder that encodes at least some blocks in the base layer and the enhancement layer using inter-layer prediction as described above, wherein the encoder maps a motion vector for a block in the enhancement layer to a scaled motion vector of a corner of a corresponding mapped block from a set of mapped blocks in the base layer, and assigns a reference index for the block in the enhancement layer to that of the corner of the corresponding mapped block in the base layer, the block in the enhancement layer and the set of mapped blocks in the base layer included in the at least some blocks, the block in the enhancement layer being co-located with respect to the set of mapped blocks in the base layer.

Additionally, another advantage/feature is the scalable video encoder that constrains the spatial scaling factor as described above, wherein the encoder encodes at least some blocks in the base layer and the enhancement layer by setting the spatial scaling factor equal to $2^{(-n)}$, n being an integer greater than zero, and performing averaging for texture downsampling of residues corresponding to the at least some blocks.

Moreover, another advantage/feature is the scalable video encoder as described above, wherein the at least two views are encoded by enabling weighted prediction for cross view prediction between the particular view and the at least one other view.

Further, another advantage/feature is the scalable video encoder that encodes the at least two views by enabling cross view prediction as described above, wherein the weighted prediction is enabled when coding a difference between a macroblock in the enhancement layer and a weighted macroblock scaled from a set of mapped macroblocks in the base layer, the macroblock in the enhancement layer being co-located with respect to the set of mapped macroblocks in the base layer.

Additionally, another advantage/feature is the scalable video encoder as described above, wherein the at least two views correspond to a pair of stereoscopic views, with one view of the pair being encoded as the base layer and another view of the pair being encoded as the enhancement layer using a prediction from the base layer.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus comprising:
an encoder configured to encode at least two views corresponding to multi-view video content by, encoding a particular view of the at least two views as a base layer, and encoding each of at least one other view of the at least two views as an enhancement layer using a prediction from a lower layer corresponding to at least one of the particular view and the at least one other view,
wherein the at least two views are encoded based on a selection from among at least two of temporal, spatial, and signal to noise ratio scalability techniques,
wherein said encoder is configured to constrain a spatial scaling factor to be equal to or less than one, when the spatial scalability technique is selected, and
wherein said encoder is configured to encode at least some blocks in the base layer and the enhancement layer using inter-layer prediction, by setting the spatial scaling factor equal to $2^{(-n)}$, n being an integer greater than zero, performing a many-to-one block mapping from the base layer to the enhancement layer, converting any of the at least some blocks in the base layer having an intra prediction mode to an inter-prediction mode, and forcing motion vectors and discrete cosine transform coefficients in the intra-prediction mode to be zero.

2. The apparatus of claim 1, wherein said encoder is configured to map a motion vector for a block in the enhancement layer to a scaled motion vector of a corner of a corresponding mapped block from a set of mapped blocks in the base layer, and to assign a reference index for the block in the enhancement layer to that of the corner of the corresponding mapped block in the base layer, the block in the enhancement layer and the set of mapped blocks in the base layer included in the at least some blocks, the block in the enhancement layer being co-located with respect to the set of mapped blocks in the base layer.

3. An apparatus comprising:
an encoder configured to encode at least two views corresponding to multi-view video content by, encoding a particular view of the at least two views as a base layer, and encoding each of at least one other view of the at least two views as an enhancement layer using a prediction from a lower layer corresponding to at least one of the particular view and the at least one other view,
wherein the at least two views are encoded based on a selection from among at least two of temporal, spatial, and signal to noise ratio scalability techniques,
wherein said encoder is configured constrain a spatial scaling factor to be equal to or less than one, when the spatial scalability technique is selected, and
wherein said encoder is configured to encode at least some blocks in the base layer and the enhancement layer by setting the spatial scaling factor equal to $2^{(-n)}$, n being an integer greater than zero, and to perform averaging for texture downsampling of residues corresponding to the at least some blocks.

4. A method for scalable video encoding, comprising
encoding at least two views corresponding to multi-view video content by, encoding a particular view of the at least two views as a base layer, and encoding each of at least one other view of the at least two views as an enhancement layer using a prediction from a lower layer corresponding to at least one of the particular view and the at least one other view, wherein the at least two views are encoded based on a selection from among at least two of temporal, spatial, and signal to noise ratio scalability techniques, wherein said encoding comprises constraining a spatial scaling factor to be equal to or less than one, when the spatial scalability technique is selected, and wherein said encoding encodes at least some blocks in the base layer and the enhancement layer using inter-layer prediction, by setting the spatial scaling factor equal to $2^{(-n)}$, n being an integer greater than zero, performing a many-to-one block mapping from the base layer to the enhancement layer, converting any of the at least some blocks in the base layer having an intra prediction mode to an inter-prediction mode, and forcing motion vectors and discrete cosine transform coefficients in the intra-prediction mode to be zero.

5. The method of claim 4, wherein said encoding maps a motion vector for a block in the enhancement layer to a scaled motion vector of a corner of a corresponding mapped block from a set of mapped blocks in the base layer, and assigns a reference index for the block in the enhancement layer to that of the corner of the corresponding mapped block in the base layer, the block in the enhancement layer and the set of mapped blocks in the base layer included in the at least some blocks, the block in the enhancement layer being co-located with respect to the set of mapped blocks in the base layer.

6. A method for scalable video encoding, comprising
encoding at least two views corresponding to multi-view video content by, encoding a particular view of the at least two views as a base layer, and encoding each of at least one other view of the at least two views as an enhancement layer using a prediction from a lower layer corresponding to at least one of the particular view and the at least one other view, wherein the at least two views are encoded based on a selection from among at least two of temporal, spatial, and signal to noise ratio scalability techniques, wherein said encoding comprises constraining a spatial scaling factor to be equal to or less than one, when the spatial scalability technique is selected, and wherein said encoding encodes at least some blocks in the base layer and the enhancement layer by setting the spatial scaling factor equal to $2^{(-n)}$, n being an integer greater than zero, and performing averaging for texture downsampling of residues corresponding to the at least some blocks.

7. An apparatus comprising:
an encoder configured to encode a first stereoscopic view as a base layer, and to encode at least one of a depth map and a disparity map as an enhancement layer using a prediction from the first stereoscopic view, wherein the first stereoscopic view and the at least one of the depth map and the disparity map each correspond to a particular stereoscopic content and are encoded based on a selection from among at least two of temporal, spatial, and SNR scalability techniques, wherein said encoder is configured to constrain a spatial scaling factor to be equal to or less than one, when the spatial scalability technique is selected, and wherein said encoder is configured to encode at least some blocks in the base layer and the enhancement layer using inter-layer prediction, by setting the spatial scaling factor equal to $2^{(-n)}$, n being an integer greater than zero, performing a many-to-one block mapping from the base layer to the enhancement layer, converting any of the at least some blocks in the base layer having an intra prediction mode to an inter-prediction mode, and forcing motion vectors and discrete cosine transform coefficients in the intra-prediction mode to be zero.

8. The apparatus of claim 7, wherein said encoder is configured to map a motion vector for a block in the enhancement layer to a scaled motion vector of a corner of a corresponding mapped block from a set of mapped blocks in the base layer, and to assign a reference index for the block in the enhancement layer to that of the corner of the corresponding mapped block in the base layer, the block in the enhancement layer and the set of mapped blocks in the base layer included in the at least some blocks, the block in the enhancement layer being co-located with respect to the set of mapped blocks in the base layer.

9. An apparatus comprising:
an encoder configured to encode a first stereoscopic view as a base layer, and to encode at least one of a depth map and a disparity map as an enhancement layer using a prediction from the first stereoscopic view, wherein the first stereoscopic view and the at least one of the depth map and the disparity map each correspond to a particular stereoscopic content and are encoded based on a selection from among at least two of temporal, spatial, and SNR scalability techniques, wherein said encoder is configured to constrain a spatial scaling factor to be equal to or less than one, when the spatial scalability technique is selected, and wherein said encoder is configured to encode at least some blocks in the base layer and the enhancement layer by setting the spatial scaling factor equal to $2^{(-n)}$, n being an integer greater than zero, and performing averaging for texture downsampling of residues corresponding to the at least some blocks.

10. A method for scalable video encoding, comprising:
encoding a first stereoscopic view as a base layer; and
encoding at least one of a depth map and a disparity map as an enhancement layer using a prediction from the first stereoscopic view, wherein the first stereoscopic view and the at least one of the depth map and the disparity map each correspond to a particular stereoscopic content and are encoded based on a selection from among at least two of temporal, spatial, and SNR scalability techniques, wherein said encoder constrains a spatial scaling factor to be equal to or less than one, when the spatial scalable video encoding technique is selected, and wherein said encoding encodes at least some blocks in the base layer and the enhancement layer using inter-layer prediction, by setting the spatial scaling factor equal to $2^{(-n)}$, n being an integer greater than zero, performing a many-to-one block mapping from the base layer to the enhancement layer, converting any of the at least some blocks in the base layer having an intra prediction mode to an inter-prediction mode, and forcing motion vectors and discrete cosine transform coefficients in the intra-prediction mode to be zero.

11. The method of claim 10, wherein said encoding maps a motion vector for a block in the enhancement layer to a scaled motion vector of a corner of a corresponding mapped block from a set of mapped blocks in the base layer, and assigns a reference index for the block in the enhancement layer to that of the corner of the corresponding mapped block in the base layer, the block in the enhancement layer and the set of mapped blocks in the base layer included in the at least some blocks, the block in the enhancement layer being co-located with respect to the set of mapped blocks in the base layer.

12. A method for scalable video encoding, comprising:
   encoding a first stereoscopic view as a base layer; and
   encoding at least one of a depth map and a disparity map as an enhancement layer using a prediction from the first stereoscopic view,
   wherein the first stereoscopic view and the at least one of the depth map and the disparity map each correspond to a particular stereoscopic content and are encoded based on a selection from among at least two of temporal, spatial, and SNR scalability techniques,
   wherein said encoder constrains a spatial scaling factor to be equal to or less than one, when the spatial scalable video encoding technique is selected, and
   wherein said encoding encodes at least some blocks in the base layer and the enhancement layer by setting the spatial scaling factor equal to $2^{(-n)}$, n being an integer greater than zero, and performing averaging for texture downsampling of residues corresponding to the at least some blocks.

* * * * *